US010532648B2

(12) United States Patent
Ohashi

(10) Patent No.: US 10,532,648 B2
(45) Date of Patent: Jan. 14, 2020

(54) POWER TRANSMISSION DEVICE FOR HYBRID VEHICLE

(71) Applicant: Kabushiki Kaisha F.C.C., Hamamatsu-shi (JP)

(72) Inventor: Tatsuyuki Ohashi, Hamamatsu (JP)

(73) Assignee: Kabushiki Kaisha F.C.C., Hamamatsu-shi (JP)

( * ) Notice: Subject to any disclaimer, the term of this patent is extended or adjusted under 35 U.S.C. 154(b) by 170 days.

(21) Appl. No.: 15/722,082

(22) Filed: Oct. 2, 2017

(65) Prior Publication Data
US 2018/0022206 A1 Jan. 25, 2018

Related U.S. Application Data

(63) Continuation of application No. PCT/JP2016/060912, filed on Apr. 1, 2016.

(30) Foreign Application Priority Data

Apr. 3, 2015 (JP) .................. 2015-076932

(51) Int. Cl.
*B60W 10/08* (2006.01)
*B60W 10/10* (2012.01)
(Continued)

(52) U.S. Cl.
CPC .............. *B60K 6/48* (2013.01); *B60K 6/543* (2013.01); *B60W 10/06* (2013.01); *B60W 10/08* (2013.01);
(Continued)

(58) Field of Classification Search
CPC .......... B60K 6/48; B60K 6/387; B60K 6/543; B60L 50/16; B60W 20/40; B60W 10/115;
(Continued)

(56) References Cited

U.S. PATENT DOCUMENTS 6,524,217 B1 * 2/2003 Murakami ............. B60K 6/365
180/65.225
6,615,940 B2 * 9/2003 Morisawa ................ B60K 6/46
180/65.1
(Continued)

FOREIGN PATENT DOCUMENTS

JP 2000-255285 9/2000
JP 2003-165348 6/2003
(Continued)

*Primary Examiner* — Jacob S. Scott
*Assistant Examiner* — Lillian T Nguyen
(74) *Attorney, Agent, or Firm* — Harness, Dickey & Pierce, P.L.C.

(57) ABSTRACT

A power transmission device for a hybrid vehicle with a first clutch (1a) and a second clutch (1b). The first clutch (1a) is capable of transmitting or cutting off driving power of an engine (E) to driving wheels (D). The second clutch (1b) is capable of transmitting or cutting off power of a motor (M) to the driving wheels (D). The power transmission device is capable of appropriately operating the first clutch (1a) and the second clutch (1b) in accordance with driving conditions of the vehicle. When the engine (E) is started by transmitting power from the motor (M) to the engine (E), via the first clutch (1a) and the second clutch (1b), the power transmission device slip-controls the first clutch (1a) and the second clutch (1b).

7 Claims, 11 Drawing Sheets

*1:Oil-pressure control circuit

(51) Int. Cl.
*B60W 20/00* (2016.01)
*F16H 61/662* (2006.01)
*F16H 63/50* (2006.01)
*B60K 6/48* (2007.10)
*B60K 6/543* (2007.10)
*B60W 10/06* (2006.01)
*F16H 59/56* (2006.01)
*F16H 59/74* (2006.01)
*F02D 29/00* (2006.01)
*B60W 10/18* (2012.01)
*B60W 20/30* (2016.01)
*B60W 20/17* (2016.01)

(52) U.S. Cl.
CPC .......... *B60W 10/18* (2013.01); *B60W 20/17* (2016.01); *B60W 20/30* (2013.01); *F02D 29/00* (2013.01); *F16H 59/56* (2013.01); *F16H 59/74* (2013.01); *F16H 63/50* (2013.01)

(58) Field of Classification Search
CPC .... B60W 10/107; B60W 10/02; B60W 10/18; B60W 10/08; B60W 10/06; B60W 20/17; B60W 20/30; B60W 2710/081; F16H 63/50; F16H 61/02; F16H 59/74; F16H 59/56; F02D 29/00; Y02T 10/6252
See application file for complete search history.

(56) References Cited

U.S. PATENT DOCUMENTS

| | | | | |
|---|---|---|---|---|
| 2006/0272869 | A1* | 12/2006 | Hidaka | ............... B60K 6/48 180/65.25 |
| 2011/0237389 | A1 | 9/2011 | Ohashi et al. | |
| 2011/0301796 | A1 | 12/2011 | Ohashi et al. | |

FOREIGN PATENT DOCUMENTS

| | | |
|---|---|---|
| JP | 2006-103471 | 4/2006 |
| JP | 2007-131070 | 5/2007 |
| JP | 2010-115943 | 5/2010 |
| JP | 2010-173419 | 8/2010 |
| JP | 2010-188785 | 9/2010 |
| JP | 2010-188905 | 9/2010 |
| JP | 2014-080084 | 5/2014 |
| JP | 2014-101048 | 6/2014 |
| JP | 2015-058870 | 3/2015 |
| WO | WO2004-111441 | 12/2004 |
| WO | WO2010-047095 | 4/2010 |

\* cited by examiner

[Fig 1]
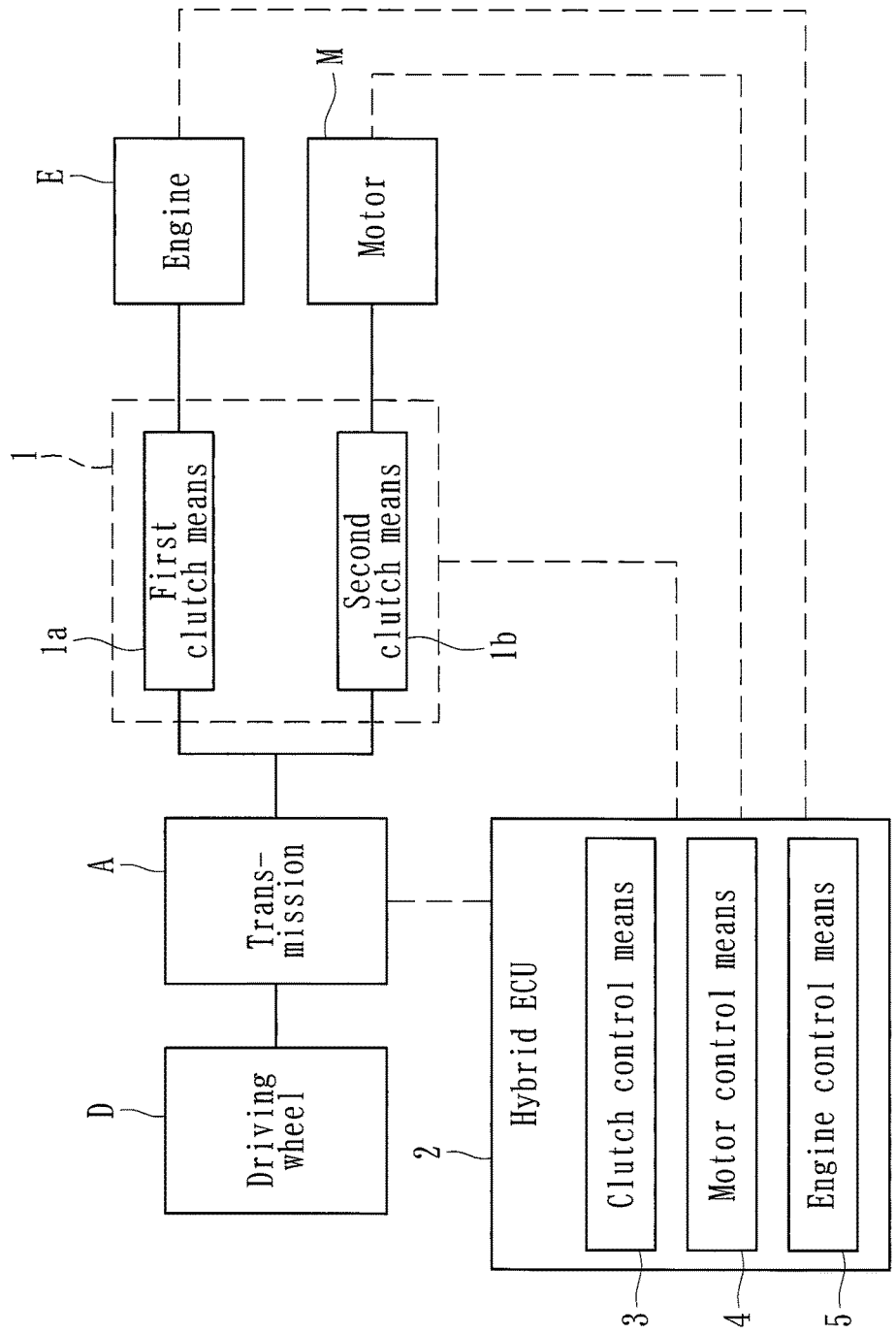

[Fig 2]
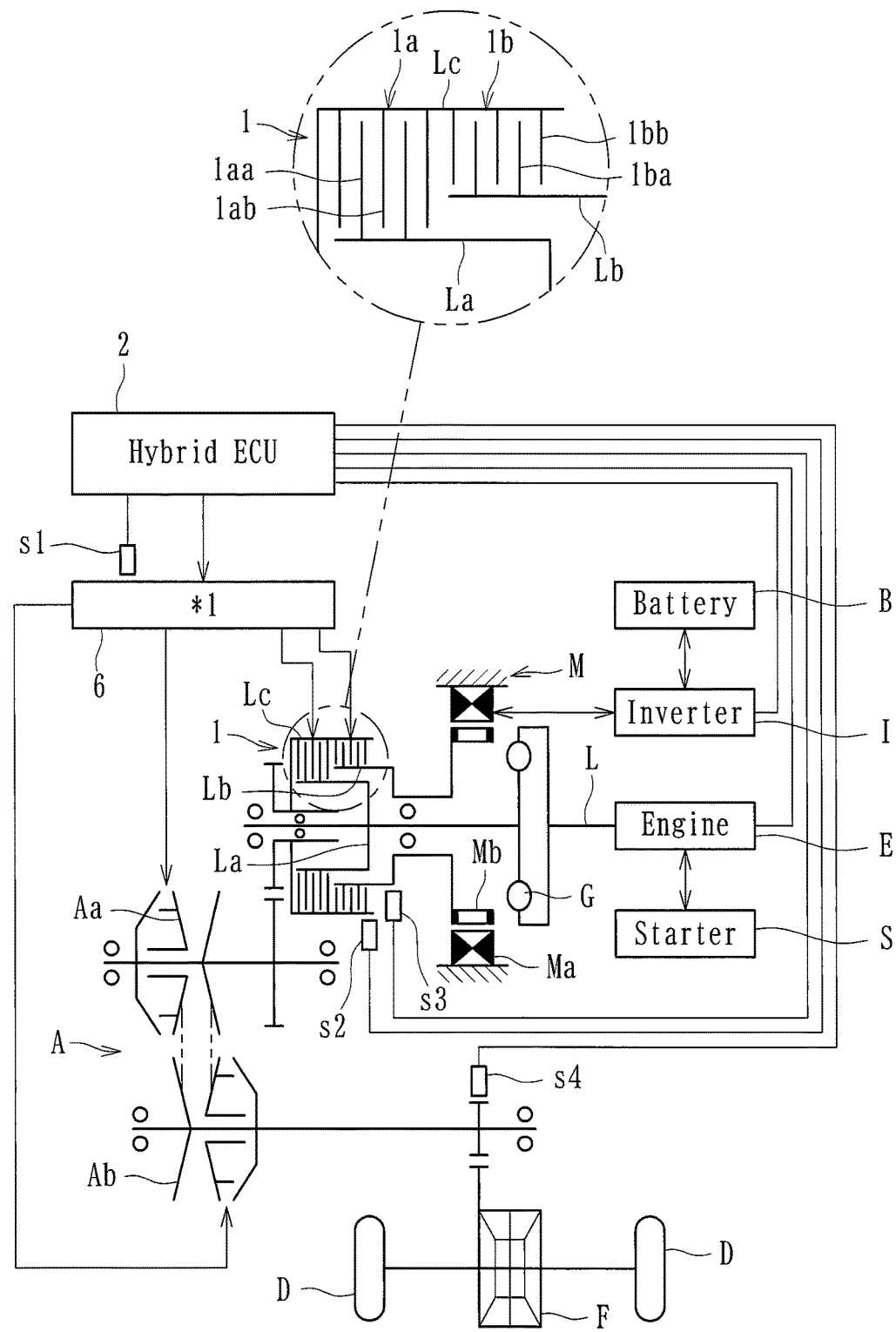
*1: Oil-pressure control circuit

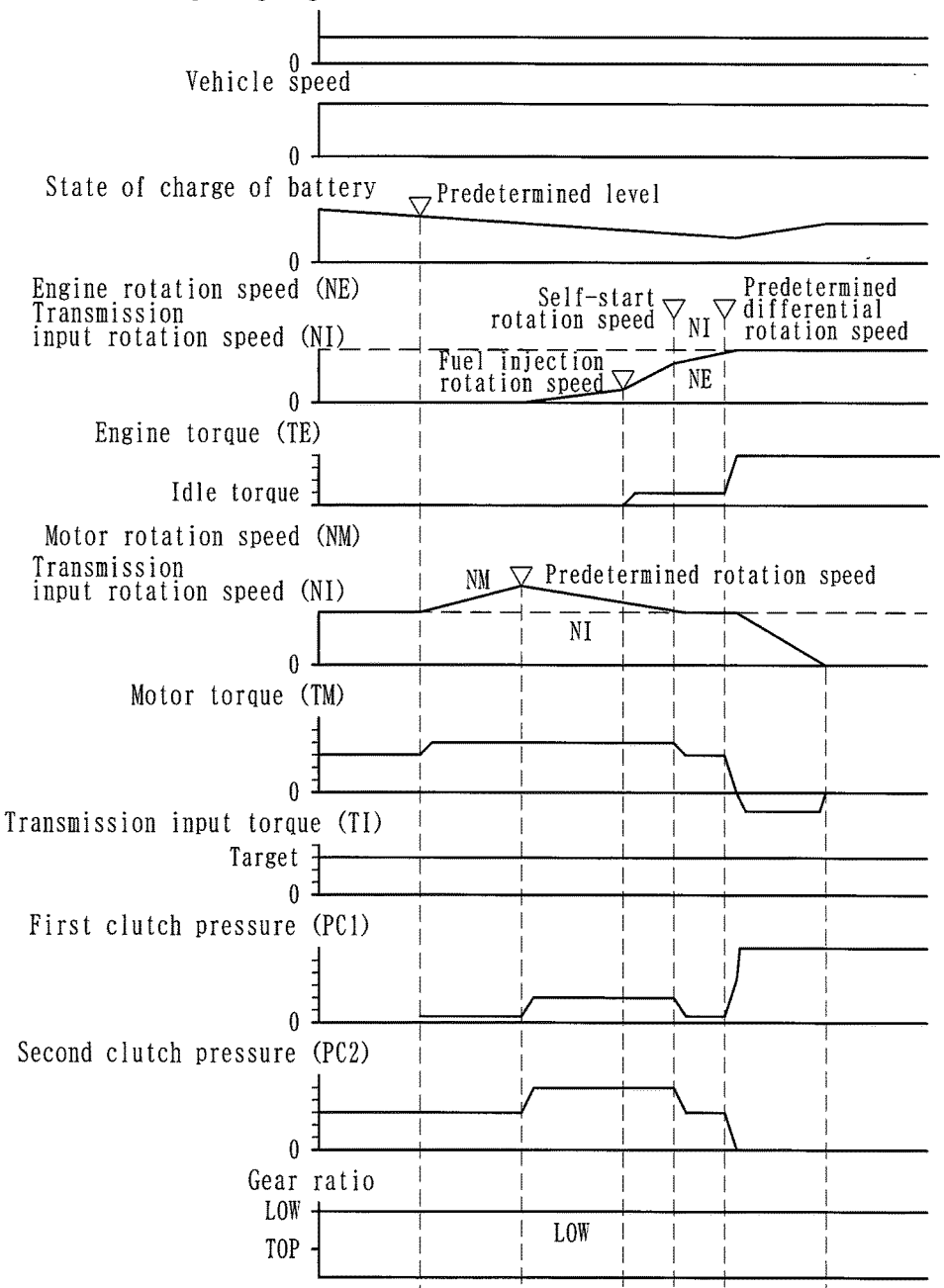
[Fig 3]

[Fig 4]

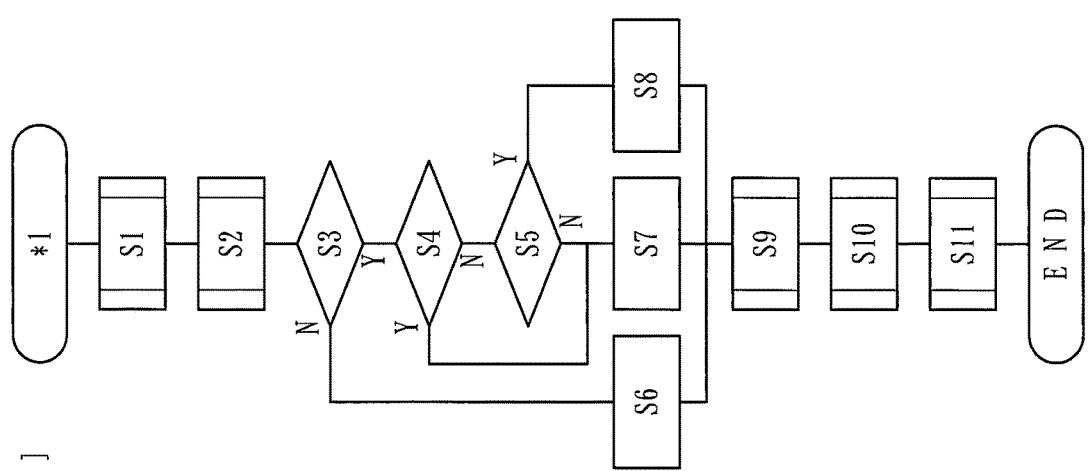

(*1) Hybrid main
(S1) Gear ratio FB control
(S2) TI setting
(S3) State of charge of battery ≦ Predetermined level ?
(S4) NI ≦ Predetermined rotation speed ?
(S5) Has predetermined time elapsed in a state in which differential rotation speed between NE and NI is lower than or equal to predetermined differential rotation speed ?
(S6) Drive mode = Motor
(S7) Drive mode = Hybrid
(S8) Drive mode = Engine
(S9) Motor control
(S10) Clutch control
(S11) Engine control

[ Fig 5 ]
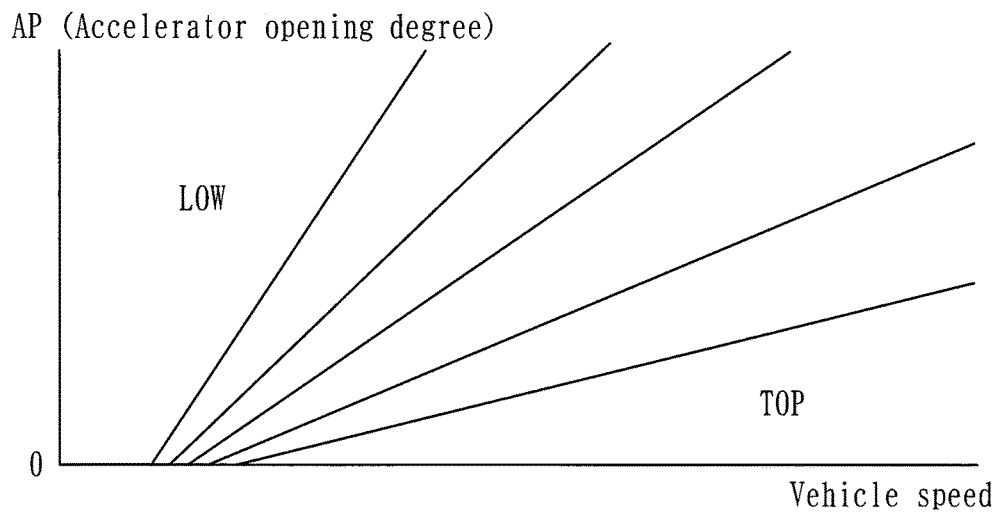
[ Fig 6 ]
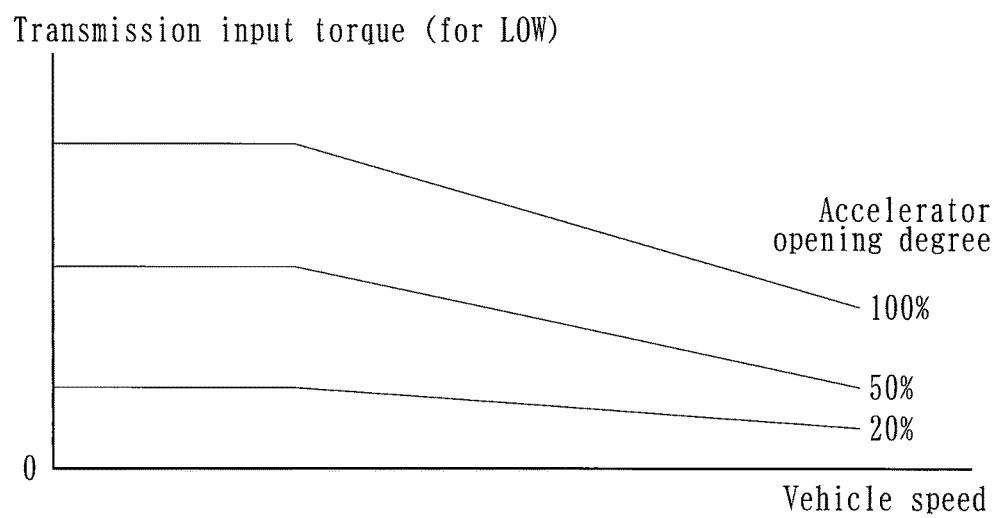

[Fig 7]
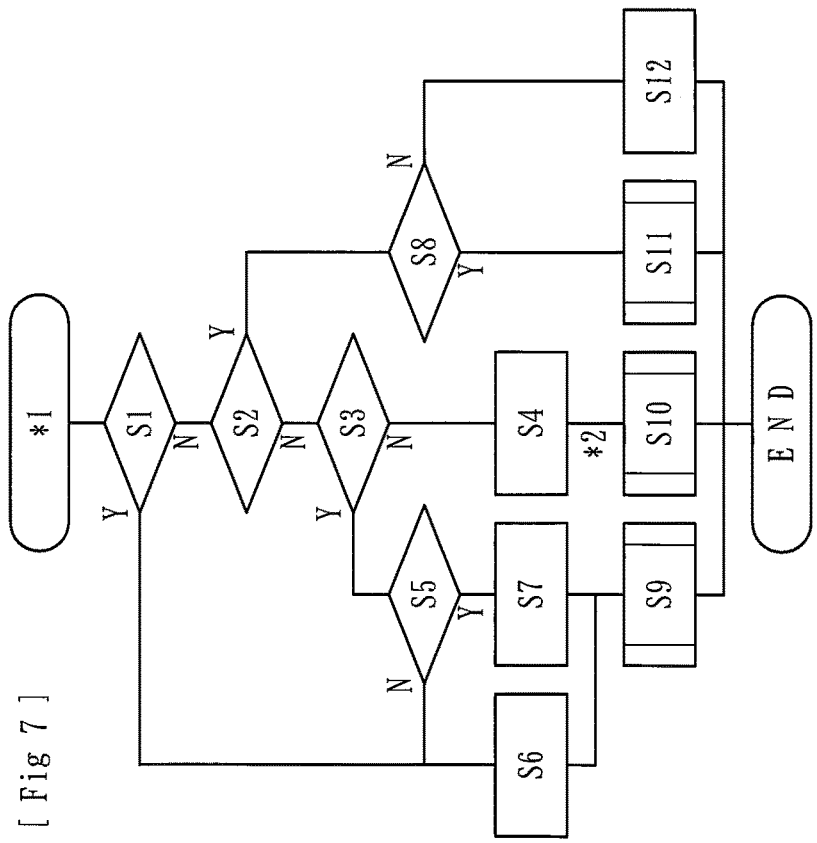
(*1) Motor control
(S1) Drive mode = Motor ?
(S2) Drive mode = Engine ?
(S3) NE ≧ Self-start rotation speed ?
(S4) TM = TI + engine start torque
(S5) NE ≧ NI ?
(S6) TM = TI
(S7) TM = TI − TE
(S8) NM > 0 ?
(S9) Drive
(S10) Start engine
(S11) Regenerate
(S12) Stop
(*2) Check upper limit by using motor maximum torque

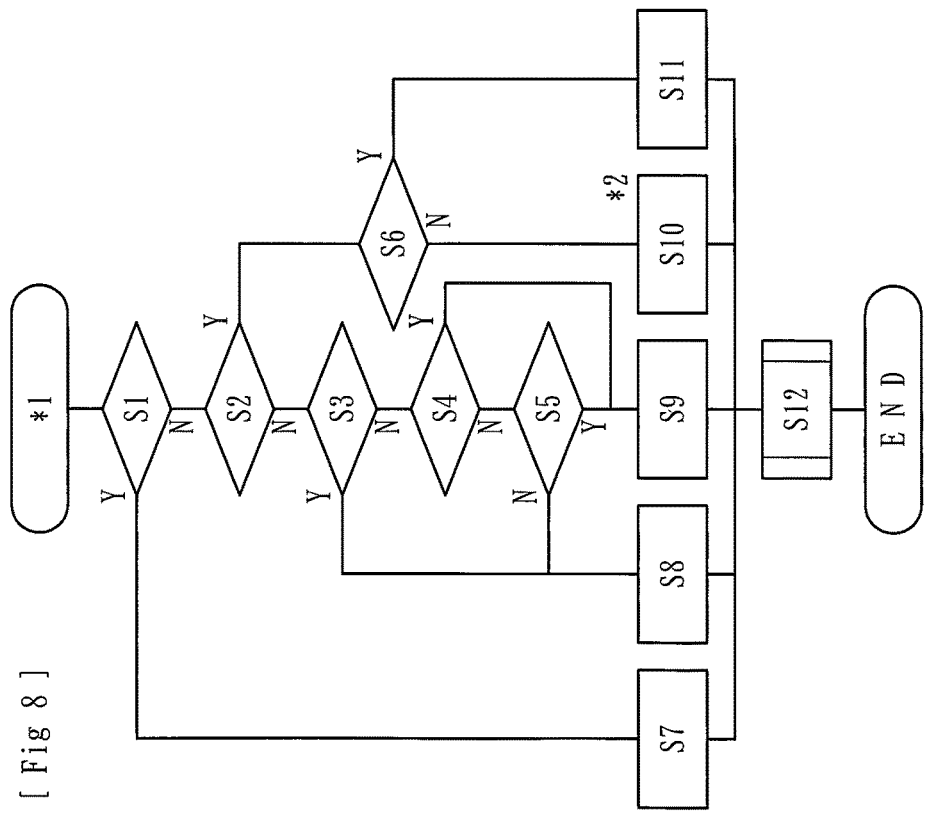

[Fig 8]

(*1) Clutch control (First)
(S1) Drive mode = Motor ?
(S2) Drive mode = Engine ?
(S3) NE ≧ Self-start rotation speed ?
(S4) TC1 : Outputting T engine start ?
(S5) NM ≧ Predetermined rotation speed ?
(S6) Differential rotation speed between NE and NI lower than or equal to predetermined rotation speed ?
(S7) TC1 = 0
(S8) TC1 = TMIN
(S9) TC1 = T engine start
(S10) TC1 = TC1 + ΔTC1
(S11) TC1 = TMAX
(S12) First clutch pressure calculation
(*2) Check upper limit by using TMAX

[Fig 9]
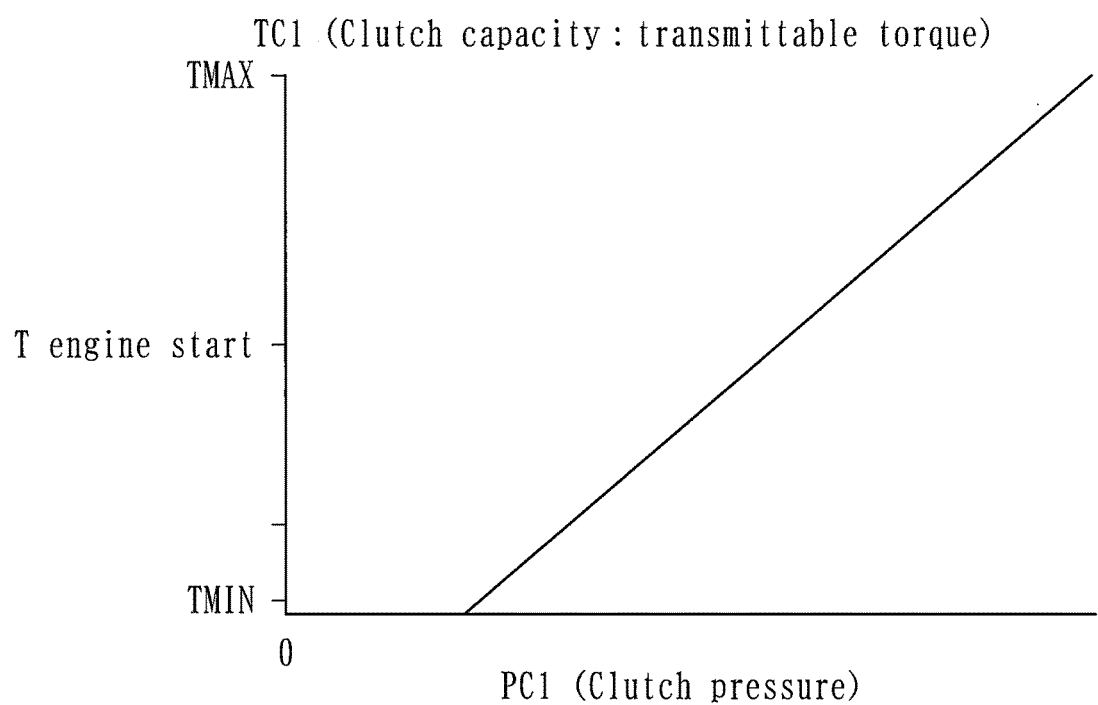

[Fig 10]

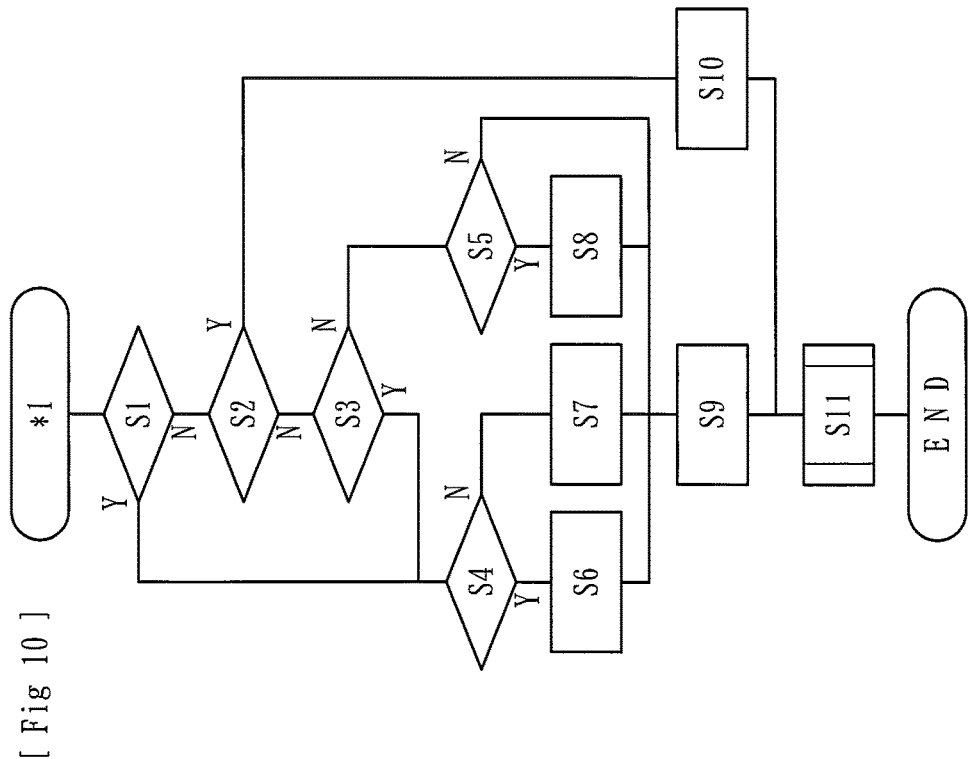

(*1) Clutch control (Second)
(S1) Drive mode = Motor ?
(S2) Drive mode = Engine ?
(S3) NE ≧ Self-start rotation speed ?
(S4) Differential rotation speed between NM and NI lower than or equal to predetermined rotation speed ?
(S5) TM − TI ≦ Predetermined torque ?
(S6) TC2H = TH2H − ΔTC2
(S7) TC2H = TC2H + ΔTC2
(S8) TI = Predetermined coefficient × TI
(S9) TC2 = TI + TC1 + TC2H
(S10) TC2 = TI − TC1
(S11) Second clutch pressure calculation

[Fig 11]
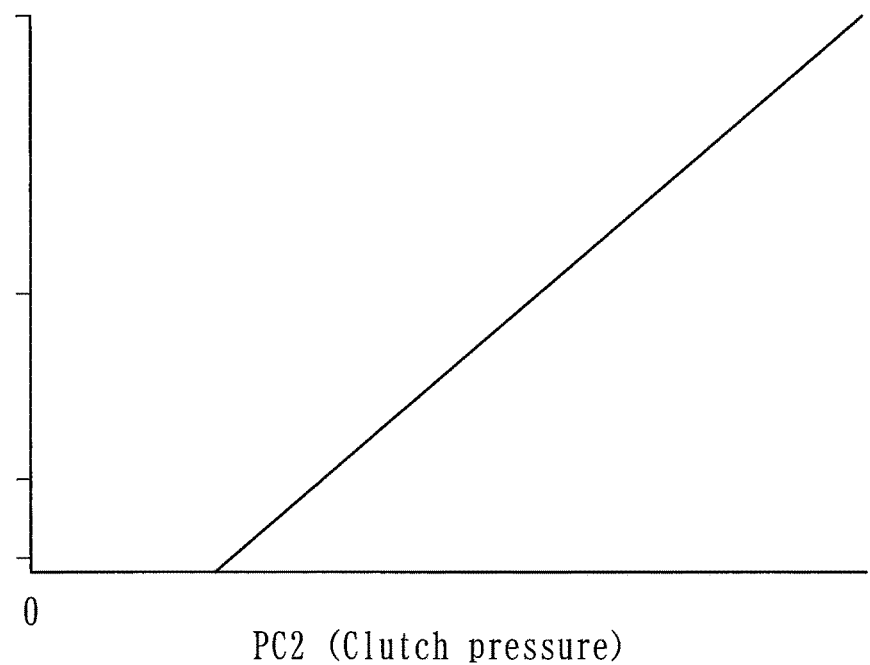

[Fig 12]

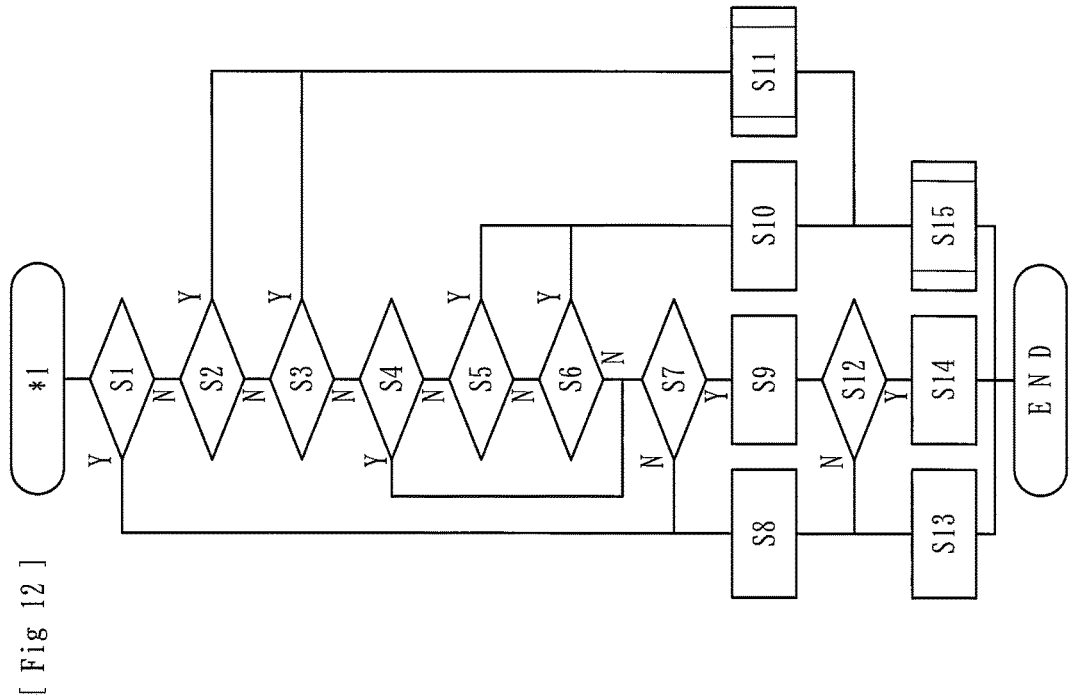

(*1) Engine control
(S1) Drive mode = Motor ?
(S2) Drive mode = Engine ?
(S3) NE ≧ Self-start rotation speed ?
(S4) Engine being started (by motor) ?
(S5) Engine being started (by starter) ?
(S6) Vehicle speed ≦ set vehicle speed ?
(S7) TC1 Outputting T engine start ?
(S8) Stop
(S9) Start (motor)
(S10) Start (starter)
(S11) Drive
(S12) NE ≧ Fuel injection rotation speed ?
(S13) Fuel cut
(S14) Fuel injection
(S15) Fuel control (injection or cut)

POWER TRANSMISSION DEVICE FOR HYBRID VEHICLE

CROSS-REFERENCE TO RELATED APPLICATIONS

This application is a continuation of International Application No. PCT/JP2016/060912, filed Apr. 1, 2016, which claims priority to Japanese Application No. 2015-076932, filed Apr. 3, 2015. The disclosures of the above applications are incorporating herein by reference.

FIELD

The present disclosure relates to a hybrid vehicle power transmission device that is capable of appropriately operating a first clutch and a second clutch in accordance with the driving conditions of the vehicle.

BACKGROUND

Recently, hybrid vehicles, with both an engine and a motor as the driving power source, have attracted attention due to their improvement in fuel efficiency and environmental measures. The hybrid vehicles selectively and appropriately drive one of the engine and the motor or simultaneously drive both the engine and the motor in accordance with the driving conditions. Thus, the hybrid vehicles can achieve higher fuel efficiently and lower gas emission than vehicles that are driven only by an engine.

A hybrid vehicle power transmission device, for example, has proposed a device that performs the following operation when starting an engine by increasing the torque of a traction motor while the vehicle is being driven by the motor. The device increases the rotational speed of the engine by operating a clutch (first clutch) to start the engine. The device selects a second clutch. The second clutch has the maximum transmission torque capacity among clutches of the automatic transmission to form gear steps. The device controls the transmission torque capacity of the second clutch by slip-engaging the second clutch (see, Japanese Unexamined Patent Application Publication No. 2007-131070). Also, a device has been proposed that performs the following operation when starting an engine by using rotation energy of a traction motor while the vehicle is being driven by the motor. The device increases the rotation speed of the motor while slip-controlling a starting clutch (second clutch). Also, it engages a clutch to start the engine when the rotation speed of the motor reaches a predetermined rotation speed (see, Japanese Unexamined Patent Application Publication No. 2000-255285).

SUMMARY

The aforementioned hybrid vehicle power transmission devices, according to the existing technology, are capable of starting the engine while suppressing transmission of torque variation of the motor to the driving wheels by slip-controlling the second clutch when starting the engine while the vehicle is being driven by the motor. The power transmission devices have a problem where the differential rotation speed of the clutch (first clutch) for starting the engine increases. That is, when the second clutch is slip-controlled, a difference (differential rotation speed) between the input rotation speed and the output rotation speed of the clutch occurs. The rotation speed of the motor increases. Therefore, compared with a method where the second clutch is not slip-controlled, the differential rotation speed of the first clutch increases. Thus, it is likely that increased heat damage occurs to the first clutch. This occurs when the first clutch is operated to increase the rotation speed of the engine.

The present disclosure, which has been devised against such a background, provides a hybrid vehicle power transmission device that, when starting an engine by using a traction motor while the vehicle is being driven by the motor, can start the engine while suppressing transmission of torque variation of the motor to a driving wheel. Also, it can suppress an increase in the differential rotation speed of a clutch for starting the engine.

According to the disclosure, a hybrid vehicle power transmission device includes a first clutch and a second clutch. The first clutch is disposed in a drivetrain extending from an engine installed in the vehicle to a driving wheel. The first clutch is capable of transmitting or cutting off driving power of the engine to the driving wheel. The second clutch is disposed in a drivetrain extending from a motor installed in the vehicle to the driving wheel. The second clutch is capable of transmitting or cutting off driving power of the motor to the driving wheel. The power transmission device is capable of appropriately operating the first clutch and the second clutch in accordance with the driving conditions of the vehicle. When starting the engine by transmitting power from the motor to the engine, via the first clutch and the second clutch, the power transmission device slip-controls the first clutch and the second clutch.

According to the disclosure, the hybrid vehicle power transmission device, described above, when starting the engine by transmitting power from the motor to the engine via the first clutch and the second clutch, the power transmission device slip-controls the first clutch and the second clutch. Thus, a torque calculated by subtracting a torque transmitted by the first clutch from a torque transmitted by the second clutch becomes a predetermined torque.

According to the disclosure, the hybrid vehicle power transmission device described above, includes a transmission that is disposed in a drivetrain between the engine and motor and the driving wheel. A target transmission input torque is set in accordance with an accelerator opening degree, a vehicle speed, and a gear ratio. The power transmission device slip-controls the first clutch and the second clutch. Thus, the predetermined torque becomes the target transmission input torque.

According to the disclosure, in the hybrid vehicle power transmission device, when the engine is started by transmitting power from the motor to the engine, via the first clutch and the second clutch, the power transmission device slip-controls the second clutch. This increases a rotation speed of the motor before increasing a rotation speed of the engine.

According to a disclosure, in the hybrid vehicle power transmission device, the first clutch has a gap to prevent contact of a friction material in a disengaged state. When the engine is started by transmitting power from the motor to the engine, via the first clutch and the second clutch, the power transmission device causes the first clutch to be in an ineffective-stroke-reduced state before increasing a rotation speed of the engine. The ineffective-stroke-reduced state is a state where the friction material of the first clutch is in contact without a gap and a transmitted torque is small.

According to the disclosure, in the hybrid vehicle power transmission device, the first clutch has a gap to prevent contact of a friction material in a disengaged state. When the engine is started by transmitting power from the motor to the engine, via the first clutch and the second clutch, the power transmission device causes the first clutch to be in an ineffective-stroke-reduced state when a rotation speed of the engine becomes higher than or equal to a self-start rotation speed. The ineffective-stroke-reduced state is a state where the friction material of the first clutch is in contact without a gap and a transmitted torque is small.

According to the disclosure, in the hybrid vehicle power transmission device, when the engine is started by transmitting power from the motor to the engine, via the first clutch and the second clutch and while slip-controlling the first clutch, the power transmission device causes fuel to be supplied to the engine in a state where the engine rotates and where a rotation speed of the engine is lower than a self-start rotation speed where the engine can be started by restarting supply of the fuel.

According to the disclosure, in the hybrid vehicle power transmission device, when switching to a drive mode using only the engine after the engine has been started, the power transmission device disengages the second clutch. This causes the motor to perform regeneration of rotation energy after a differential rotation speed of the first clutch becomes lower than or equal to a predetermined value.

When the engine is started by transmitting power from the motor to the engine, via the first clutch and the second clutch, the power transmission device slip-controls the first clutch and the second clutch. Therefore, the differential rotation speed that occurs between the motor and the engine can be shared between the first clutch and the second clutch. Accordingly, when starting the engine by using the traction motor, it is possible to start the engine while suppressing transmission of torque variation of the motor to the driving wheel. This suppresses an increase in the differential rotation speed of a clutch for starting the engine.

When the engine is started by transmitting power from the motor to the engine, via the first clutch and the second clutch, the power transmission device slip-controls the first clutch and the second clutch. Thus, a torque calculated by subtracting a torque transmitted by the first clutch from a torque transmitted by the second clutch becomes a predetermined torque. Therefore, even when torque variation of the motor or torque variation of the engine occurs, the torque variation can be absorbed by slip-controlling the first clutch and the second clutch. The torque transmitted to the driving wheel can be stabilized at a predetermined torque. As a result, it is possible to smoothly start the engine.

The power transmission device includes a transmission that is disposed in a drivetrain between the engine and motor and the driving wheel. A target transmission input torque is set in accordance with an accelerator opening degree, a vehicle speed, and a gear ratio. The power transmission device slip-controls the first clutch and the second clutch. Thus, the predetermined torque becomes the target transmission input torque. Therefore, it is possible to perform control so that the torque becomes the target transmission input torque even when an accelerator operation, a change in vehicle speed, or a change in gear ratio occurs while the engine is being started. Thus, it is possible to start the engine while controlling the torque transmitted to the driving wheel to be a torque required by the driver.

When the engine is started by transmitting power from the motor to the engine, via the first clutch and the second clutch, the power transmission device slip-controls the second clutch so as to increase the rotation speed of the motor before increasing the rotation speed of the engine. Therefore, even when starting the engine by using rotation energy of the motor, it is possible to suppress an increase in the differential rotation speed of the first clutch by slip-controlling the second clutch.

The first clutch has a gap to prevent contact of a friction material in a disengaged state. When the engine is started by transmitting power from the motor to the engine, via the first clutch and the second clutch, the power transmission device causes the first clutch to be in an ineffective-stroke-reduced state before increasing the rotation speed of the engine. The ineffective-stroke-reduced state is a state where the friction material of the first clutch is in contact without a gap and a transmitted torque is small. Therefore, when increasing the rotation speed of the engine, it is possible to suppress delay of a change in the torque transmission of the first clutch from a change in the torque transmission of the second clutch and to improve responsivity.

The clutch (first clutch) for starting the engine has a gap to prevent contact of a friction material in a disengaged state. When the engine is started by transmitting power from the motor to the engine, via the first clutch and the second clutch, the power transmission device causes the first clutch to be in an ineffective-stroke-reduced state when the rotation speed of the engine becomes higher than or equal to a self-start rotation speed. The ineffective-stroke-reduced state is a state where the friction material of the first clutch is in contact without a gap and the transmitted torque is small. Therefore, it is possible to increase rotation without fail by using the engine alone. Moreover, it is possible to increase the transmission torque of the first clutch when the differential rotation speed of the first clutch becomes higher than or equal to a predetermined value. When the first clutch is disengaged, it is possible to suppress delay of a change in the torque transmission of the first clutch and to improve responsivity.

When the engine is started by transmitting power from the motor to the engine, via the first clutch and the second clutch, while slip-controlling the first clutch, the power transmission device causes fuel to be supplied to the engine in a state where the engine rotates and where a rotation speed of the engine is lower than a self-start rotation speed where the engine can be started by restarting the supply of the fuel. Therefore, it is possible to increase the rotation speed of the engine in a short time by using not only the transmission torque of the first clutch but also the torque of the engine.

When switching to a drive mode using only the engine after the engine has been started, the power transmission device disengages the second clutch to cause the motor to perform regeneration of rotation energy after the differential rotation speed of the first clutch becomes lower than or equal to a predetermined value. Therefore, it is possible to cause the motor to perform regeneration of rotation energy while preventing influence on the driving power.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a power transmission device for a hybrid vehicle.

FIG. 2 is a schematic view of the overall structure of the hybrid vehicle power transmission device.

FIG. 3 is a timing chart representing how the hybrid vehicle power transmission device is controlled.

FIG. 4 is a flowchart representing a main control of the hybrid vehicle power transmission device.

FIG. 5 is a graph representing a ratio characteristic map of the hybrid vehicle power transmission device.

FIG. 6 is a graph representing correspondence between a transmission input torque of the hybrid vehicle power transmission device and a vehicle speed and an accelerator opening degree.

FIG. 7 is a flowchart representing motor control of the hybrid vehicle power transmission device.

FIG. 8 is a flowchart representing clutch control (control of first clutch) of the hybrid vehicle power transmission device.

FIG. 9 is graph representing a clutch capacity characteristic of the first clutch of the hybrid vehicle power transmission device.

FIG. 10 is a flowchart representing clutch control (control of second clutch) of the hybrid vehicle power transmission device.

FIG. 11 is a graph representing a clutch capacity characteristic of the second clutch of the hybrid vehicle power transmission device.

FIG. 12 is a flowchart representing engine control of the hybrid vehicle power transmission device.

DETAILED DESCRIPTION

Hereinafter, an embodiment of the present disclosure will be described in detail with reference to the drawings.

A hybrid vehicle power transmission device according to the present embodiment is used to transmit or cut off driving power of an engine E and a motor M, that are the driving power source of the hybrid vehicle, to the wheels (driving wheels D). As illustrated in FIGS. 1 and 2, the power transmission device mainly includes a first clutch 1a, second clutch 1b, a transmission A, and a hybrid ECU 2 with a clutch control mechanism 3, motor control mechanism 4, and engine control mechanism 5.

As illustrated in FIG. 1, the power transmission device according to the present embodiment includes the first clutch 1a and second clutch 1b. The first clutch 1a is disposed in a drivetrain extending from the engine E, installed in the hybrid vehicle, to the driving wheels D. The first clutch is capable of transmitting or cutting off the driving power of the engine E to the driving wheels D. The second clutch 1b is disposed in a drivetrain extending from the motor M, installed in the hybrid vehicle, to the driving wheels D. The second clutch is capable of transmitting or cutting off the driving power of the motor M to the driving wheels D. The first clutch 1a and the second clutch 1b constitute a unitized clutch mechanism 1.

The engine E (internal combustion engine) is one of the driving power sources of the hybrid vehicle. As illustrated in FIG. 2, the driving power of the engine E can be transmitted to an input portion La of the clutch mechanism 1 (first clutch 1a), via an output shaft L. In FIG. 2, the symbols "S" and "G", respectively, represent a starter, for starting the engine, and a damper. When the engine E is driven and when the first clutch 1a is in an engaged state or in a slipping state, the driving power of the engine E is transmitted to the transmission A via the input portion La and an output portion Lc of the first clutch 1a.

The motor M includes a stator Ma and a rotor Mb and is connected to an inverter I and a battery B installed in the hybrid vehicle. When electric power is supplied from the battery B, the driving power of the motor M can be transmitted to the input portion Lb of the clutch mechanism 1 (second clutch 1b). When the motor M is driven and when the second clutch 1b is in an engaged state or in a slipping state, the driving power of the motor M is transmitted to the transmission A, via the input portion Lb and the output portion Lc of the second clutch 1b.

The input portion La of the first clutch 1a includes drive-side clutch plates 1aa. The clutch plates 1aa rotate as the engine E is driven. The output portion Lc of the first clutch 1a includes driven-side clutch plates lab. The drive-side clutch plates 1aa and the driven-side clutch plates lab are alternately arranged. Thus, power is transmitted when the drive-side clutch plates 1aa and the driven-side clutch plates lab, adjacent one another, are pressed against each other. This occurs when hydraulic oil is supplied to a piston, not shown, in the clutch and press-contact force acts on the clutch plates. Transmission of power is cut off when the press-contact force is released. When the drive-side clutch plates 1aa and the driven-side clutch plates lab, adjacent one another, slip over each other, a predetermined amount of power can be transmitted.

The input portion Lb of the second clutch 1b includes drive-side clutch plates 1ba, that rotate as the motor M is driven. The output portion Lc of the second clutch 1b includes driven-side clutch plates 1bb. The drive-side clutch plates 1ba and the driven-side clutch plates 1bb are alternately arranged. Thus, power is transmitted when the drive-side clutch plates 1ba and the driven-side clutch plates 1bb, adjacent one another are pressed against each other. Transmission of power is cut off when the press-contact force is released. When the drive-side clutch plates 1ba and the driven-side clutch plates 1bb, adjacent one another, slip over each other, a predetermined amount of power can be transmitted.

The transmission A is disposed in a drivetrain between the engine E and the motor M and the driving wheels D. The transmission A is a continuously variable transmission that can adjust the driving power of the engine E and the motor M by changing the gear ratio of the transmission. It can transmit the driving power to the driving wheels D. The transmission A includes a drive pulley Aa and a driven pulley Ab. In the present embodiment, the rotation of the motor M is adjustable. That is, when the hybrid vehicle is driven by the driving power of the motor M (driven by only the driving power of the motor M or driven by both of the driving power of the motor M and the driving power of the engine E), by operating the transmission A, it is possible to appropriately change the driving power transmitted to the driving wheels D and to adjust the rotation of the motor M. When the rotation of the motor M is adjusted, the driving power (torque) needed by the driving wheels D, in accordance with the accelerator opening degree, can be obtained by adjusting the motor torque by controlling an electric current or an electric voltage applied to the motor M.

Thus, when one of the engine E and the motor M is driven (engine drive or motor drive) or both of the engine E and the motor M are driven (hybrid drive) and the first clutch 1a or the second clutch 1b is in a power transmitting state (an engaged state or a slipping state), the driving power of the engine E or the motor M is transmitted to the driving wheels D, via the transmission A. Thus, the vehicle can move.

As illustrated in FIG. 2, the power transmission device according to the present embodiment includes sensors s1-s4. Sensor s1 can detect the temperature of the oil (oil temperature). Sensor s2 can detect the input rotation speed of the transmission A. Sensor s3 that can detect the rotation speed of the motor M. Sensor s4 can detect the vehicle speed. Electric signals detected by the sensors s1 to s4 are sent to the hybrid ECU 2. In FIG. 2, the symbol "F" denotes a differential gear of the vehicle.

The hybrid ECU 2 is composed of, for example, a microcomputer and the like installed in the vehicle. It can control an oil-pressure control circuit 6 in accordance with the driving conditions of the vehicle. The hybrid ECU 2 includes the clutch control mechanism 3, the motor control mechanism 4, and the engine control mechanism 5. The clutch control mechanism 3 appropriately operates the first clutch 1*a* and the second clutch 1*b* by controlling the oil-pressure control circuit 6. It switches the clutches between a state where power can be transmitted (engaged state or slipping state) and a state where transmission of power is cut off (disengaged state).

The motor control mechanism 4 is included in the hybrid ECU 2. It controls the motor M on the basis of an accelerator opening degree, a brake operation, a detection value from sensors, and the like. The engine control mechanism 5 is included in the hybrid ECU 2. It controls the engine E on the basis of an accelerator opening degree, a brake operation, a detection value from sensors, and the like.

The hybrid vehicle power transmission device according to the present embodiment causes the hybrid ECU 2 to slip-control the first clutch 1*a* and the second clutch 1*b*, as illustrated in FIG. 3, when the engine E is started by transmitting power to the engine E from the motor M, via the first clutch 1*a* and the second clutch 1*b*. That is, while the vehicle is being driven by the motor M, when the engine E is started by transmitting power to the engine E from the motor M, via the first clutch 1*a* and the second clutch 1*b*, the power transmission device is capable of transmitting power to start the engine E to the engine E by slip-controlling both of the first clutch 1*a* and the second clutch 1*b*.

Moreover, when starting the engine E by transmitting power from the motor M to the engine E, via the first clutch 1*a* and the second clutch 1*b*, the hybrid ECU 2, according to the present embodiment, slip-controls the first clutch 1*a* and the second clutch 1*b* so that a torque calculated by subtracting a torque transmitted by the first clutch 1*a* from a torque transmitted by the second clutch 1*b* becomes a predetermined torque. To be specific, as described above, the present embodiment includes transmission A disposed in the drivetrain between the engine E and the motor M and the driving wheels D. For example, as illustrated in FIG. 6, a target transmission input torque is set in accordance with an accelerator opening degree, a vehicle speed, and a gear ratio. As illustrated in FIG. 3 (see, in particular, a part of the graph illustrating a target value of the transmission input torque (TI) before the time when the engine drive mode starts), the hybrid ECU 2 slip-controls the first clutch 1*a* and the second clutch 1*b* so that the predetermined torque becomes the target transmission input torque.

Furthermore, when starting the engine E by transmitting power from the motor M to the engine E, via the first clutch 1*a* and the second clutch 1*b*, as illustrated in FIG. 3 (see, in particular, a part of the graph illustrating the motor rotation speed (NM) and the transmission input rotation speed (NI) from the time when the hybrid drive mode starts to the time when starting of the engine starts), the hybrid ECU 2 according to the present embodiment slip-controls the second clutch 1*b* so as to increase the rotation speed of the motor M before increasing the rotation speed of the engine E.

In addition, the first clutch 1*a*, according to the present embodiment, has a gap to prevent contact of a friction material in a disengaged state. When the engine E is started by transmitting power from the motor M to the engine E, via the first clutch 1*a* and the second clutch 1*b*, as illustrated in FIG. 3 (see, in particular, in a part of the graph illustrating the first clutch pressure (PC1) from the time when the hybrid drive mode starts to the time when engine starts), the power transmission device causes the first clutch 1*a* to be in an ineffective-stroke-reduced state before increasing the rotation speed of the engine E. The ineffective-stroke-reduced state is a state where the friction material of the first clutch 1*a* is in contact without a gap and a transmitted torque is small.

In the present embodiment, when the engine E is started by transmitting power from the motor M to the engine E, via the first clutch 1*a* and the second clutch 1*b*, as illustrated in FIG. 3 (see, in particular, in a part of the graph illustrating the first clutch pressure (PC1) from the time when driving of the engine starts to the time when the engine drive mode starts), the power transmission device causes the first clutch 1*a* to be in an ineffective-stroke-reduced state when the rotation speed of the engine E becomes higher than or equal to a self-start rotation speed. The ineffective-stroke-reduced state is a state where the friction material of the first clutch 1*a* is in contact without a gap and a transmitted torque is small.

Moreover, in the present embodiment, when the engine E is started by transmitting power from the motor M to the engine E, via the first clutch 1*a* and the second clutch 1*b*, while slip-controlling the first clutch 1*a*, as illustrated in FIG. 3 (see, in particular, in a part of the graph illustrating the engine torque (TE) at the time when engine injection starts), the power transmission device causes fuel to be supplied to the engine E in a state where the engine E rotates and where the rotation speed of the engine E is lower than a self-start rotation speed where the engine can be started by restarting the supply of fuel.

Furthermore, in the present embodiment, as illustrated in FIG. 3 (see, in particular, in a part of the graph illustrating the motor torque (TM) while the motor performs regeneration), when switching to a drive mode using only the engine E after the engine E has been started, the power transmission device disengages the second clutch 1*b* to cause the motor M to perform regeneration of rotation energy after the differential rotation speed of the first clutch 1*a* becomes lower than or equal to a predetermined value.

Next, referring to the flowchart of FIG. 4, main control, according to the present embodiment, will be described. Assumptions are as follows. The vehicle is driven by the motor M when the charged state of the battery is sufficient. The vehicle is always started by the motor M. The engine is started by the motor M or the starter S when the charged state of the battery becomes low.

First, gear ratios are set in accordance with an accelerator opening degree and a vehicle speed, as illustrated in FIG. 5. The transmission A is controlled in accordance with the gear ratios (step S1). As illustrated in FIG. 6, the target transmission input torque (TI) is set in accordance with an accelerator opening degree, a vehicle speed, and a gear ratio (step S2). FIG. 6 shows a map when the ratio is LOW.

Subsequently, in step S3, it is determined whether or not the charged state of the battery is lower than or equal to a predetermined level. If it is determined that the charged state of the battery is higher than the predetermined level, the process proceeds to step S6 to set the drive mode to "motor". If it is determined that the charged state of the battery is lower than or equal to the predetermined level, the process proceeds to step S4. Here, it is determined whether or not the transmission input rotation speed (NI) is lower than or equal to a predetermined rotation speed. If it is determined in step S4 that the transmission input rotation speed (NI) is higher than the predetermined rotation speed, the process proceeds to step S5. Here it is determined whether or not a predetermined time has elapsed in a state where the differential rotation speed between the engine rotation speed (NE) and the transmission input rotation speed (NI) is lower than or equal to a predetermined differential rotation speed. If it is determined that the transmission input rotation speed (NI) is lower than or equal to the predetermined rotation speed, step S5 is skipped. The process proceeds to step S7. That is, because the transmission input rotation speed (NI) is low and the charged state of charge of the battery is low, the process proceeds to step S7 to start the engine. The drive mode is set to "hybrid".

If it is determined in step S5 that the predetermined time has elapsed in the state where the differential rotation speed between the engine rotation speed (NE) and the transmission input rotation speed (NI) is lower than or equal to the predetermined differential rotation speed, the process proceeds to step S8. The drive mode is set to "engine". If it is determined that the predetermined time has not elapsed in the state where the differential rotation speed between the engine rotation speed (NE) and the transmission input rotation speed (NI) is lower than or equal to the predetermined differential rotation speed, the process proceeds to step S7. The drive mode is set to "hybrid". Thus, the drive mode is set to one of "motor" (step S6), "hybrid" (step S7), and "engine" (step S8). Subsequently, motor control step S9, shown in FIG. 7, clutch control step S10, shown in FIGS. 8 and 10, and engine control step S11, shown in FIG. 12 are performed.

Next, referring to the flowchart of FIG. 7, motor control according to the present embodiment will be described.

First, in step S1, it is determined whether or not the drive mode is "motor". If the drive mode is "motor", the process proceeds to step S6. The motor torque (TM) is set to the target transmission input torque (TI). The motor M is driven in step S9. If it is determined in step S1 that the drive mode is not "motor", the process proceeds to step S2. It is determined whether or not the drive mode is "engine". If it is determined that the drive mode is "engine", the process proceeds to step S8. It is determined whether or not the motor rotation speed (NM) is higher than 0. If it is determined in step S8 that the motor rotation speed (NM) is higher than 0, the motor M performs regeneration of rotation energy in step S11. If it is determined that the motor rotation speed (NM) is 0, the motor M is stopped in step S12.

If it is determined in step S2 that the drive mode is not "engine" (that is, the drive mode is "hybrid"), the process proceeds to step S3. It is determined whether or not the engine rotation speed (NE) is higher than or equal to the self-start rotation speed. If it is determined that the engine rotation speed (NE) is higher than or equal to the self-start rotation speed, the process proceeds to step S5. It is determined whether or not the engine rotation speed (NE) is higher than or equal to the transmission input rotation speed (NI). If it is determined in step S5 that the engine rotation speed (NE) is lower than the transmission input rotation speed (NI), the process proceeds to step S6. The motor torque (TM) is set to the target transmission input torque (TI). The motor M is driven in step S9. If it is determined that the engine rotation speed (NE) is higher than or equal to the transmission input rotation speed (NI), the process proceeds to step S7. The motor torque (TM) is set to a value (subtracted value) calculated by subtracting the engine torque (TE) from the target transmission input torque (TI). The motor M is driven in step S9.

If it is determined in step S3 that the engine rotation speed (NE) is lower than the self-start rotation speed, the process proceeds to step S4. The motor torque (TM) is set to a value (added value) calculated by adding the engine start torque to the target transmission input torque (TI). The engine E is started in step S10. In step S4, an upper limit is checked by using the maximum torque of the motor M. Through the process described above, one of "drive" (S9), "start engine" (S10), "regenerate" (S11), and "stop" (step S12) is selected as control of the motor M.

Next, referring to the flowchart of FIG. 8, clutch control, according to the present embodiment (control of the first clutch 1*a*) will be described. The first clutch 1*a* has a capacity characteristic illustrated in FIG. 9. Here, "TMIN" denotes an ineffective-stroke-reduced state, where the friction material of the first clutch 1*a* is in contact without a gap and a transmitted torque is small.

First, in step S1, it is determined whether or not the drive mode is "motor". If it is determined that the drive mode is "motor", the process proceeds to step S7. The clutch capacity (TC1) of the first clutch is is set to 0. If it is determined that the drive mode is not "motor", the process proceeds to step S2. It is determined whether or not the drive mode is "engine".

If it is determined in step S2 that the drive mode is "engine", the process proceeds to step S6. It is determined whether or not the differential rotation speed between the engine rotation speed (NE) and the transmission input rotation speed (NI) is lower than or equal to a predetermined rotation speed. If it is determined that the differential rotation speed is lower than or equal to the predetermined rotation speed, the process proceeds to step S11. The clutch capacity (TC1) is set to the maximum value (TMAX). If it is determined in step S6 that the differential rotation speed between the engine rotation speed (NE) and the transmission input rotation speed (NI) is not lower than or equal to the predetermined rotation speed, the process proceeds to step S10. The clutch capacity (TC1) is set to a value (added value) calculated by adding ΔTC1 to TC1. In step S10, an upper limit is checked by using TMAX.

If it is determined in step S2 that the drive mode is not "engine", the process proceeds to step S3. It is determined whether or not the engine rotation speed (NE) is higher than or equal to the self-start rotation speed. If it is determined that the engine rotation speed (NE) is higher than or equal to the self-start rotation speed, the process proceeds to step S8. The clutch capacity (TC1) is set to TMIN. If it is determined in step S3 that the engine rotation speed (NE) is lower than the self-start rotation speed, the process proceeds to step S4. It is determined whether or not TC1 is outputting T engine start. If it is determined that TC1 is not outputting T engine start, in step S5, it is determined whether or not the motor rotation speed (NM) is higher than or equal to a predetermined rotation speed. If it is determined in step S4 that TC1 is outputting T engine start, step S5 is skipped, and the process proceeds to step S9.

If it is determined in step S5 that the motor rotation speed (NM) is higher than or equal to the predetermined rotation speed, it is determined that rotation energy for starting the engine has been accumulated. The process proceeds to step S9. The clutch capacity (TC1) is set to a value required to start the engine. If it is determined in step S5 that the motor rotation speed (NM) is not higher than or equal to the predetermined rotation speed, the process proceeds to step S8. The clutch capacity (TC1) is set to the minimum value (TMIN). Thus, as control of the first clutch 1*a*, the clutch capacity (TC1) is selected from 0 (step S7), TMIN (step S8), a value required to start the engine (step S9), a value calculated by adding ΔTC1 (step S10), and TMAX (step S11); and the first clutch pressure (the clutch pressure of the first clutch 1a) is calculated on the basis of the graph illustrated in FIG. 9 (step S12).

Next, referring to the flowchart of FIG. 10, clutch control according to the present embodiment (control of the second clutch 1b) will be described. The second clutch 1b has a capacity characteristic illustrated in FIG. 11.

First, in step S1, it is determined whether or not the drive mode is "motor". If it is determined that the drive mode is "motor", the process proceeds to step S4. It is determined whether or not the differential rotation speed between the motor rotation speed (NM) and the transmission input rotation speed (NI) is lower than or equal to a predetermined rotation speed. If it is determined in step S4 that the differential rotation speed between the motor rotation speed (NM) and the transmission input rotation speed (NI) is lower than or equal to a predetermined rotation speed, the process proceeds to step S6. TC2H is set to a value (subtracted value) that is calculated by subtracting ATC2 from TC2H. The clutch capacity (TC2) is set to TI+TC1+TC2H in step S9.

If it is determined in step S4 that the differential rotation speed between the motor rotation speed (NM) and the transmission input rotation speed (NI) is not lower than or equal to a predetermined rotation speed, the process proceeds to step S7. TC2H is set to a value (added value) calculated by adding ΔTC2 to TC2H. The clutch capacity (TC2) is set to TI+TC1+TC2H in step S9. If it is determined in step S1 that the drive mode is not "motor", the process proceeds to step S2. It is determined whether or not the drive mode is "engine". If it is determined that the drive mode is "engine", the process proceeds to step S10. The clutch capacity (TC2) is set to TI-TC1.

If it is determined in step S2 that the drive mode is not "engine", the process proceeds to step S3. It is determined whether or not the engine rotation speed (NE) is higher than or equal to the self-start rotation speed. If it is determined that the engine rotation speed NE is higher than or equal to the self-start rotation speed, the process proceeds to step S4, and the steps described above are sequentially performed. If it is determined in step S3 that the engine rotation speed (NE) is not higher than or equal to the self-start rotation speed, the process proceeds to step S5. It is determined whether or not a value (subtracted value) calculated by subtracting the target transmission input torque (TI) from the motor torque (TM) is lower than or equal to a predetermined torque.

If it is determined in step S5 that the value (subtracted value) calculated by subtracting the target transmission input torque (TI) from the motor torque (TM) is lower than or equal to the predetermined torque (torque required by the motor to start the engine) (that the torque for starting the engine by using the motor is insufficient), the process proceeds to step S8. Correction is performed by multiplying TI by a predetermined coefficient. The process proceeds to step S9. The clutch capacity (TC2) is set to TI+TC1+TC2H. If it is determined in step S5 that a value (subtracted value) calculated by subtracting the target transmission input torque (TI) from the motor torque (TM) is not lower than or equal to the predetermined torque, step S8 is skipped. The process proceeds to step S9. Thus, the clutch capacity (TC2) is obtained, and the second clutch pressure (the clutch pressure of the second clutch 1b) is calculated on the basis of the graph illustrated in FIG. 11 (step S11).

Next, referring to the flowchart of FIG. 12, the engine control according to the present embodiment will be described.

First, in step S1, it is determined whether or not the drive mode is "motor". If it is determined that the drive mode is "motor", the process proceeds to step S8. The engine E is stopped and caused to be in a fuel cut state (fuel cut) in step S13. If it is determined in step S1 that the drive mode is not "motor", the process proceeds to step S2. It is determined whether or not the drive mode is "engine". If the drive mode is "engine", the engine E is driven in step S11. Fuel control (injection or fuel cut) is performed in step S15.

If it is determined in step S2 that the drive mode is not "engine", the process proceeds to step S3. It is determined whether or not the engine rotation speed (NE) is higher than or equal to the self-start rotation speed. If it is determined that the engine rotation speed (NE) is higher than or equal to the self-start rotation speed, the process proceeds to step S11. The steps described above are performed. If it is determined in step S3 that the engine rotation speed (NE) is not higher than or equal to the self-start rotation speed, whether or not the engine is being started by using the motor is determined in step S4. If it is determined that the engine is not being started by using the motor, the process proceeds to step S5. It is determined whether or not the engine is being started by using the starter. If it is determined in step S4 that the engine is being started by using the motor, steps S5 and S6 are skipped, and the process proceeds to step S7.

If it is determined in step S5 that the engine is being started by using the starter, the engine is started by using the starter in step S10. Fuel control (injection or fuel cut) is performed in step S15. If it is determined in step S5 that the engine is not being started by using the starter, the process proceeds to step S6. It is determined whether or not the vehicle speed is lower than or equal to a predetermined vehicle speed. If it is determined that the vehicle speed is lower than or equal to the predetermined vehicle speed, the process proceeds to step S10. The steps described above are performed. If it is determined in step S6 that the vehicle speed is not lower than or equal to the predetermined vehicle speed, the process proceeds to step S7. It is determined whether or not TC1 is outputting T engine start.

If it is determined in step S7 that TC1 is outputting T engine start, the process proceeds to step S9. The engine is started by using the motor. In step S12, it is determined whether or not the engine rotation speed (NE) is higher than or equal to a fuel injection rotation speed. The process proceeds to S14, and fuel injection is performed. If it is determined in step S7 that TC1 is not outputting T engine start, the process proceeds to step S8. The steps described above are performed. Through the process described above, one of "fuel cut" (step S13), "fuel injection" (step S14), and "fuel control" (step S15) is selected as control of the engine E.

With the present embodiment, when the engine E is started by transmitting power from the motor M to the engine E, via the first clutch 1a and the second clutch 1b, the power transmission device slip-controls the first clutch 1a and the second clutch 1b. Therefore, the differential rotation speed that occurs between the motor M and the engine E can be shared between the first clutch 1a and the second clutch 1b. Accordingly, when starting the engine while the vehicle is being driven by the motor, it is possible to start the engine while suppressing transmission of torque variation of the motor M to the driving wheels D and to suppress an increase in the differential rotation speed of a clutch for starting the engine.

When the engine E is started by transmitting power from the motor M to the engine E, via the first clutch 1a and the second clutch 1b, the power transmission device slip-controls the first clutch 1a and the second clutch 1b so that a torque calculated by subtracting the torque transmitted by the first clutch 1a from the torque transmitted by the second clutch 1b becomes a predetermined torque. Therefore, even when torque variation of the motor M or torque variation of the engine occurs, the torque variation can be absorbed by slip-controlling the first clutch 1a and the second clutch 1b. The torque transmitted to the driving wheels D can be stabilized at a predetermined torque. As a result, it is possible to smoothly start the engine.

The power transmission device includes the transmission A that is disposed in the drivetrain between the engine E and the motor M and the driving wheels D. A target transmission input torque is set in accordance with an accelerator opening degree, a vehicle speed, and a gear ratio. The power transmission device slip-controls the first clutch 1a and the second clutch 1b so that the predetermined torque becomes the target transmission input torque. Therefore, it is possible to perform control so that the torque becomes the target transmission input torque even when an accelerator operation, a change in vehicle speed, or a change in gear ratio occurs while the engine is being started. Thus, it is possible to start the engine while controlling the torque transmitted to the driving wheels D to be a torque required by the driver.

Furthermore, when the engine E is started by transmitting power from the motor M to the engine E via the first clutch 1a and the second clutch 1b, the power transmission device slip-controls the second clutch 1b so as to increase the rotation speed of the motor M before increasing the rotation speed of the engine E. Therefore, even when starting the engine E by using rotation energy of the motor M, it is possible to suppress an increase in the differential rotation speed of the first clutch 1a by slip-controlling the second clutch 1b.

In addition, the first clutch 1a according to the present embodiment has a gap to prevent contact of a friction material in a disengaged state. When the engine E is started by transmitting power from the motor M to the engine E, via the first clutch 1a and the second clutch 1b, the power transmission device causes the first clutch 1a to be in an ineffective-stroke-reduced state before increasing the rotation speed of the engine E. The ineffective-stroke-reduced state is a state where the friction material of the first clutch 1a is in contact without a gap and a transmitted torque is small. Therefore, when increasing the rotation speed of the engine, it is possible to suppress delay of a change in the torque transmission of the first clutch 1a from a change in the torque transmission of the second clutch 1b and to improve responsivity.

When the engine E is started by transmitting power from the motor M to the engine E, via the first clutch 1a and the second clutch 1b, the power transmission device causes the first clutch 1a to be in the ineffective-stroke-reduced state when the rotation speed of the engine E becomes a self-start rotation speed. Therefore, it is possible to increase rotation without fail by using the engine alone. Moreover, it is possible to increase the transmission torque of the first clutch 1a when the differential rotation speed of the first clutch 1a becomes higher than or equal to a predetermined value. When the first clutch 1a is engaged, it is possible to suppress delay of a change in the torque transmission of the first clutch 1a to improve responsivity.

Moreover, when the engine E is started by transmitting power from the motor M to the engine E, via the first clutch 1a and the second clutch 1b, while slip-controlling the first clutch 1a, the power transmission device causes fuel to be supplied to the engine E in a state where the engine E rotates and where a rotation speed of the engine is lower than a self-start rotation speed where the engine E can be started by restarting supply of the fuel. Therefore, it is possible to increase the rotation speed of the engine in a short time by using not only the transmission torque of the first clutch 1a but also the torque of the engine E.

In particular, in the present embodiment, when switching to a drive mode using only the engine E after the engine E has been started, the power transmission device disengages the second clutch 1b to cause the motor M to perform regeneration of rotation energy after the differential rotation speed of the first clutch 1a becomes lower than or equal to a predetermined value. Therefore, it is possible to cause the motor M to perform regeneration of rotation energy while preventing influence on the driving power D.

The present disclosure is not limited to the embodiment described above. The present disclosure can be applied to, for example, the following devices. A device starts an engine by using a traction motor while the vehicle stops (creeps) on a slope. A device that does not cause the first clutch 1a to be in the ineffective-stroke-reduced state. A device where the motor M does not perform regeneration when switching to a drive mode using only the engine E after the engine E has been started. A device that does not increase the rotation speed of the motor M before increasing the rotation speed of the engine E when the engine E is started by transmitting power from the motor M to the engine E, via the first clutch 1a and the second clutch 1b. The engine E may be any internal combustion engine, such as a diesel engine that uses light oil as fuel, instead of an engine that uses gasoline as fuel.

The present disclosure is applicable to a hybrid vehicle power transmission device that has a different outer shape or has additional functions, as long as the power transmission device slip-controls the first clutch and the second clutch when starting the engine by transmitting power from the motor to the engine via the first clutch and the second clutch.

What is claimed is:

1. A power transmission device for a hybrid vehicle, comprising:
    a first clutch disposed in a drivetrain extending from an engine installed in the vehicle to a driving wheel, the first clutch is capable of transmitting or cutting off driving power of the engine to the driving wheel;
    a second clutch disposed in the drivetrain extending from a motor installed in the vehicle to the driving wheel, the second clutch is capable of transmitting or cutting off driving power of the motor to the driving wheel;
    the power transmission device is capable of appropriately operating the first clutch and the second clutch in accordance with driving conditions of the vehicle; and
    when the engine is started by transmitting power from the motor to the engine, via the first clutch and the second clutch, the power transmission device slip-controls the first clutch and the second clutch so that a torque calculated by subtracting a torque transmitted by the first clutch from a torque transmitted by the second clutch becomes a predetermined torque.

2. The power transmission device for the hybrid vehicle according to claim 1, further comprising a transmission disposed in the drivetrain between where the engine and motor and the driving wheel are mounted, a target transmission input torque is set in accordance with an accelerator opening degree, a vehicle speed, and a gear ratio, and the power transmission device slip-controls the first clutch and the second clutch so that the predetermined torque becomes the target transmission input torque.

3. A power transmission device for a hybrid vehicle, comprising:
a first clutch disposed in a drivetrain extending from an engine installed in the vehicle to a driving wheel, the first clutch is capable of transmitting or cutting off driving power of the engine to the driving wheel;
a second clutch disposed in the drivetrain extending from a motor installed in the vehicle to the driving wheel, the second clutch is capable of transmitting or cutting off driving power of the motor to the driving wheel;
the power transmission device is capable of appropriately operating the first clutch and the second clutch in accordance with driving conditions of the vehicle; and
when the engine is started by transmitting power from the motor to the engine, via the first clutch and the second clutch, the power transmission device slip-controls the first clutch and the second clutch so as to increase a rotation speed of the motor before increasing a rotation speed of the engine.

4. A power transmission device for a hybrid vehicle, comprising:
a first clutch disposed in a drivetrain extending from an engine installed in the vehicle to a driving wheel, the first clutch is capable of transmitting or cutting off driving power of the engine to the driving wheel and the first clutch has a gap to prevent contact of a friction material in a disengaged state;
a second clutch disposed in the drivetrain extending from a motor installed in the vehicle to the driving wheel, the second clutch is capable of transmitting or cutting off driving power of the motor to the driving wheel;
the power transmission device is capable of appropriately operating the first clutch and the second clutch in accordance with driving conditions of the vehicle; and
when the engine is started by transmitting power from the motor to the engine, via the first clutch and the second clutch, the power transmission device slip-controls the first clutch and the second clutch and the power clutch transmission device cause the first clutch to be in an ineffective-stroke-reduced state before increasing a rotation speed of the engine, the ineffective-stroke-reduced state is a state where the friction material of the first clutch is in contact without the gap and a transmitted torque is small.

5. A power transmission device for a hybrid vehicle, comprising:
a first clutch disposed in a drivetrain extending from an engine installed in the vehicle to a driving wheel, the first clutch is capable of transmitting or cutting off driving power of the engine to the driving wheel;
a second clutch disposed in the drivetrain extending from a motor installed in the vehicle to the driving wheel, the second clutch is capable of transmitting or cutting off driving power of the motor to the driving wheel;
the power transmission device is capable of appropriately operating the first clutch and the second clutch in accordance with driving conditions of the vehicle; and
when the engine is started by transmitting power from the motor to the engine, via the first clutch and the second clutch, the power transmission device slip-controls the first clutch and the second clutch and the power transmission device causes the first clutch to be in an ineffective-stroke-reduced state when a rotation speed of the engine becomes higher than or equal to a self-start rotation speed, the ineffective-stroke-reduced state is a state where the friction material of the first clutch is in contact without the gap and a transmitted torque is small.

6. A power transmission device for a hybrid vehicle, comprising:
a first clutch disposed in a drivetrain extending from an engine installed in the vehicle to a driving wheel, the first clutch is capable of transmitting or cutting off driving power of the engine to the driving wheel;
a second clutch disposed in the drivetrain extending from a motor installed in the vehicle to the driving wheel, the second clutch is capable of transmitting or cutting off driving power of the motor to the driving wheel;
the power transmission device is capable of appropriately operating the first clutch and the second clutch in accordance with driving conditions of the vehicle; and
when the engine is started by transmitting power from the motor to the engine, via the first clutch and the second clutch, the power transmission device slip-controls the first clutch and the second clutch while slip-controlling the first clutch, the power transmission device causes fuel to be supplied to the engine in a state where the engine rotates and where a rotation speed of the engine is lower than a self-start rotation speed at which the engine can be started by restarting supply of the fuel.

7. A power transmission device for a hybrid vehicle, comprising:
a first clutch disposed in a drivetrain extending from an engine installed in the vehicle to a driving wheel, the first clutch is capable of transmitting or cutting off driving power of the engine to the driving wheel;
a second clutch disposed in the drivetrain extending from a motor installed in the vehicle to the driving wheel, the second clutch is capable of transmitting or cutting off driving power of the motor to the driving wheel;
the power transmission device is capable of appropriately operating the first clutch and the second clutch in accordance with driving conditions of the vehicle; and
when the engine is started by transmitting power from the motor to the engine, via the first clutch and the second clutch, the power transmission device slip-controls the first clutch and the second clutch; and
when switching to a drive mode using only the engine after the engine has been started, the power transmission device disengages the second clutch to cause the motor to perform regeneration of rotation energy after a differential rotation speed of the first clutch becomes lower than or equal to a predetermined value.

* * * * *

UNITED STATES PATENT AND TRADEMARK OFFICE
CERTIFICATE OF CORRECTION

PATENT NO.       : 10,532,648 B2
APPLICATION NO.  : 15/722082
DATED            : January 14, 2020
INVENTOR(S)      : Tatsuyuki Ohashi Page 1 of 1

It is certified that error appears in the above-identified patent and that said Letters Patent is hereby corrected as shown below:

In the Specification

<u>Column 6</u>
Line 9     "lab" should be --1ab--
Line 10    "lab" should be --1ab--
Line 13    "lab" should be --1ab--
Line 18    "lab" should be --1ab--

<u>Column 10</u>
Line 21    "is is" should be --1a is--

<u>Column 11</u>
Line 22    "ATC2" should be --ΔTC2--

Signed and Sealed this
Sixteenth Day of June, 2020

Andrei Iancu
*Director of the United States Patent and Trademark Office*